US008686983B2

(12) United States Patent
Tsai

(10) Patent No.: US 8,686,983 B2
(45) Date of Patent: Apr. 1, 2014

(54) VOLTAGE REGULATOR, VOLTAGE REGULATION METHOD, AND LIQUID CRYSTAL DISPLAY DEVICE USING THE SAME

(75) Inventor: Jeng-Lung Tsai, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 986 days.

(21) Appl. No.: 12/783,561

(22) Filed: May 20, 2010

(65) Prior Publication Data

US 2011/0069054 A1 Mar. 24, 2011

(51) Int. Cl.
*G06F 3/038* (2013.01)

(52) U.S. Cl.
USPC .......... 345/211

(58) Field of Classification Search
USPC .......... 345/52, 204, 211–213; 323/304–309; 315/169.1; 349/19
See application file for complete search history.

(56) References Cited

U.S. PATENT DOCUMENTS 6,177,807 B1 * 1/2001 Bertin et al. .......... 326/30

* cited by examiner

*Primary Examiner* — Pegeman Karimi
(74) *Attorney, Agent, or Firm* — Muncy, Geissler, Olds & Lowe, P.C.

(57) ABSTRACT

A voltage regulator for controlling a reference pulse-voltage comprising a sequence of positive-negative pulses which defines an active range and a dummy range is disclosed. The voltage regulator includes an acquisition unit adapted to receive each pulse of the reference pulse-voltage and determine whether an alteration of the pulse is needed according to a predetermined calculation, and generate a result message when it is determined that an alteration of the voltage pulse is needed, and a voltage control unit adapted to generate an output pulse-voltage corresponding to the reference pulse-voltage. When no result message is generated, the voltage control unit is configured to output an output pulse having the same polarity as that of the received pulse of the reference pulse-voltage, and when the result message is generated, the voltage control unit is configured to output an output pulse having an opposite polarity to that of the received pulse.

20 Claims, 8 Drawing Sheets

VOLTAGE REGULATOR, VOLTAGE REGULATION METHOD, AND LIQUID CRYSTAL DISPLAY DEVICE USING THE SAME

BACKGROUND

1. Technical Field

The present disclosure generally relates to a voltage regulator and a method providing dispersion of noise energy in a liquid crystal display device, and a liquid crystal display device using the voltage regulator.

2. Description of Related Art

A commonly used liquid crystal display device is provided with a driver module to generate drain and common voltages applied to an upper glass substrate and a lower glass substrate of the liquid crystal display device, respectively. An electric field generated between the substrates aligns liquid crystals toward predetermined directions to generate a display.

A commonly used line inversion method periodically changes the polarity of the common voltage such that the direction of the electric field between the substrates is changed accordingly. Thus, periodical force in different directions acts on the liquid crystals to avoid polarization thereof. However, noise is generated by the oscillation of the liquid crystals in the periodical changing electric field, and the noise is focused at a specific frequency. If the noise frequency is in the audible range, a user's experience of the liquid crystal display device can be adversely affected.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
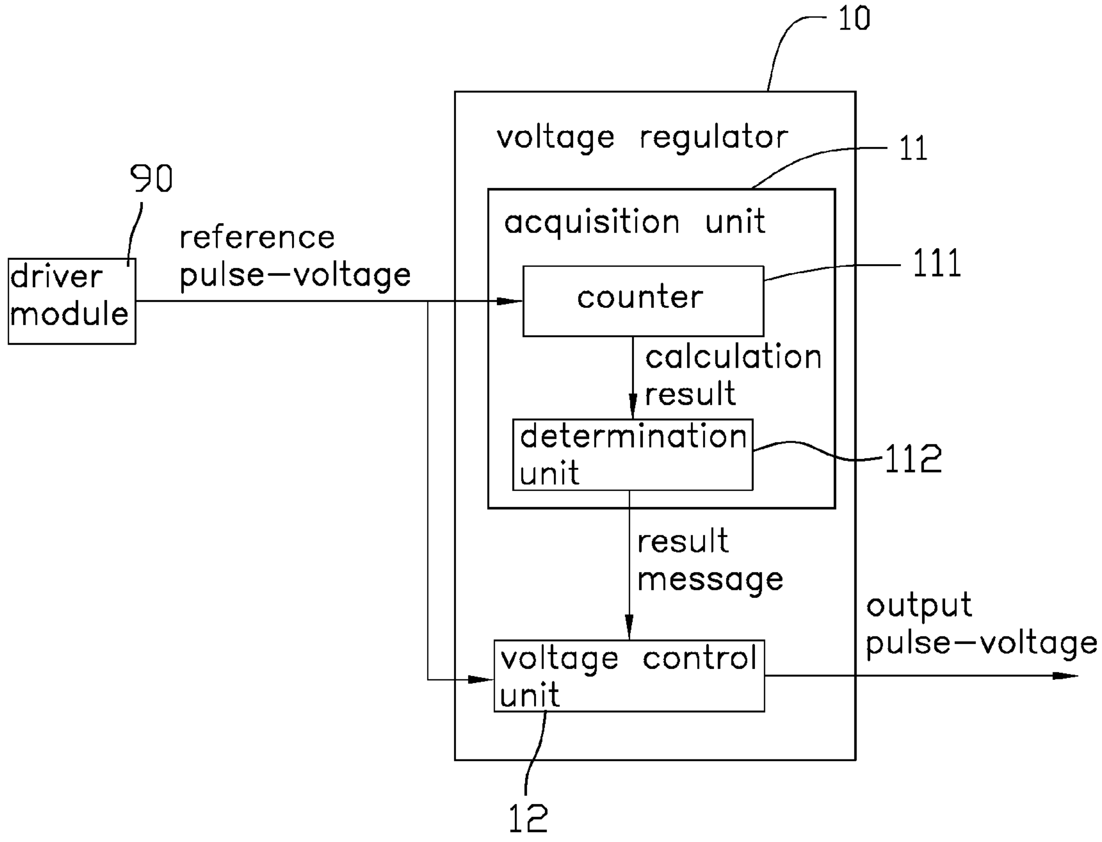
FIG. 1 is a functional block diagram showing a first embodiment of a voltage regulator, together with a driver module.
Figure 2:
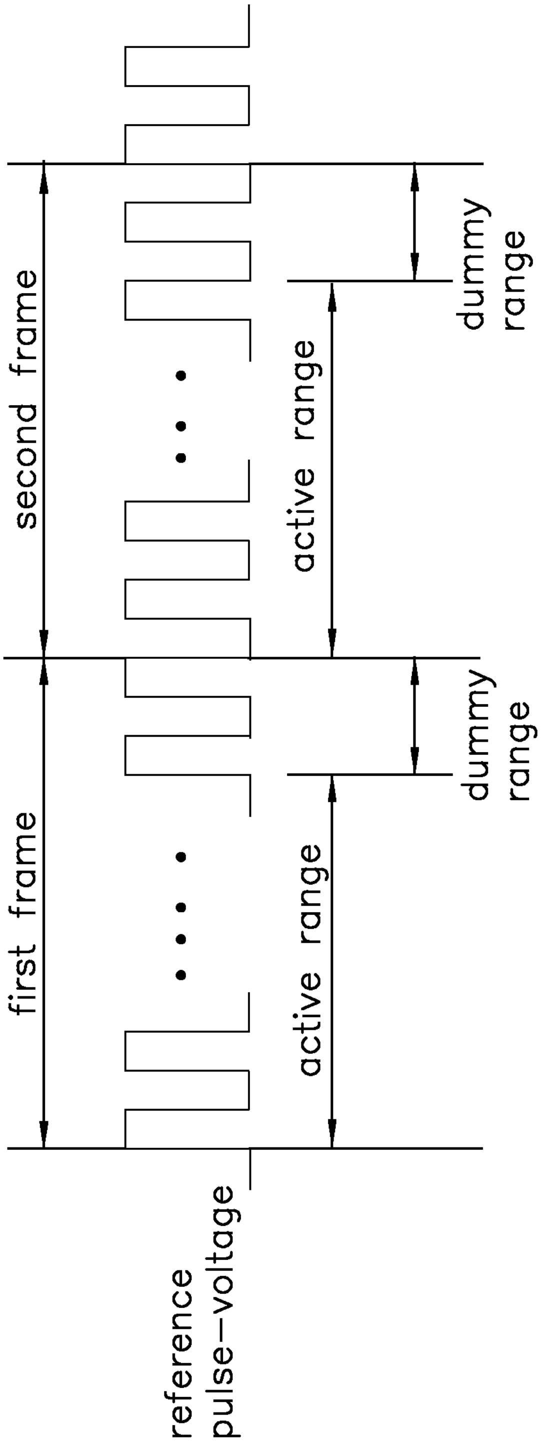
FIG. 2 is a diagram showing a reference pulse-voltage generated by the driver module of FIG. 1 varying with time, the reference pulse-voltage including dummy ranges and active ranges, the active ranges being abbreviated.

Referring to FIG. 1 and FIG. 2, a first embodiment of a voltage regulator 10 adapted to regulate a reference pulse-voltage generated by a driver module 90 is shown. In this example, the reference pulse-voltage consists of a periodical sequence of alternating positive and negative pulses.

The driver module 90 is adapted to drive the liquid crystals of an associated liquid crystal display device to display images corresponding to a sequence of frames. The frames include a first frame and a second frame next to the first frame, as illustrated in FIG. 2. The reference pulse-voltage includes active pulses and dummy pulses in any one frame. A series of continuous active pulses in any one frame forms an active range applying to a display area of the liquid crystal display device, and a series of continuous dummy pulses in the same frame forms a dummy range applying to a non-display area of the liquid crystal display device. That is, the voltage pulses, comprising positive pulses and negative pulses, in the active range are adapted to change the polarity of the liquid crystals to avoid polarization of the liquid crystals, when a frame is displayed. In contrast, the voltage pulses in the dummy range have no effect on the liquid crystals.

The voltage regulator 10 includes an acquisition unit 11 connected to the driver module 90, and a voltage control unit 12 connected to the driver module 90 and the acquisition unit 11.

The acquisition unit 11 is adapted to receive each pulse of the reference pulse-voltage generated by the driver module 90, determine whether an alteration of the pulse received is needed according to a predetermined calculation, and generate a result message when it is determined that an alteration of the pulse is needed. The acquisition unit 11 includes a counter 111, and a determination unit 112 connected to the counter 111. The counter 111 is adapted to receive the pulses of the reference pulse-voltage, and with each received pulse update a calculation result by adding one to the previous calculation result obtained when the most recent previous pulse was received. The determination unit 112 is adapted to receive the calculation result and generate a result message for transmission to the voltage control unit 12, when it is determined that the pulse received is in the dummy range. The voltage control unit 12 is adapted to receive the pulses of the reference pulse-voltage produced by the driver module 90 and produce an output pulse-voltage in response to the result message. When the result message is generated, the voltage control unit 12 outputs an output pulse having an opposite polarity to that of the corresponding pulse of the reference pulse-voltage; otherwise the voltage control unit 12 outputs an output pulse having the same polarity as that of the corresponding pulse of the reference pulse-voltage.

Figure 3:
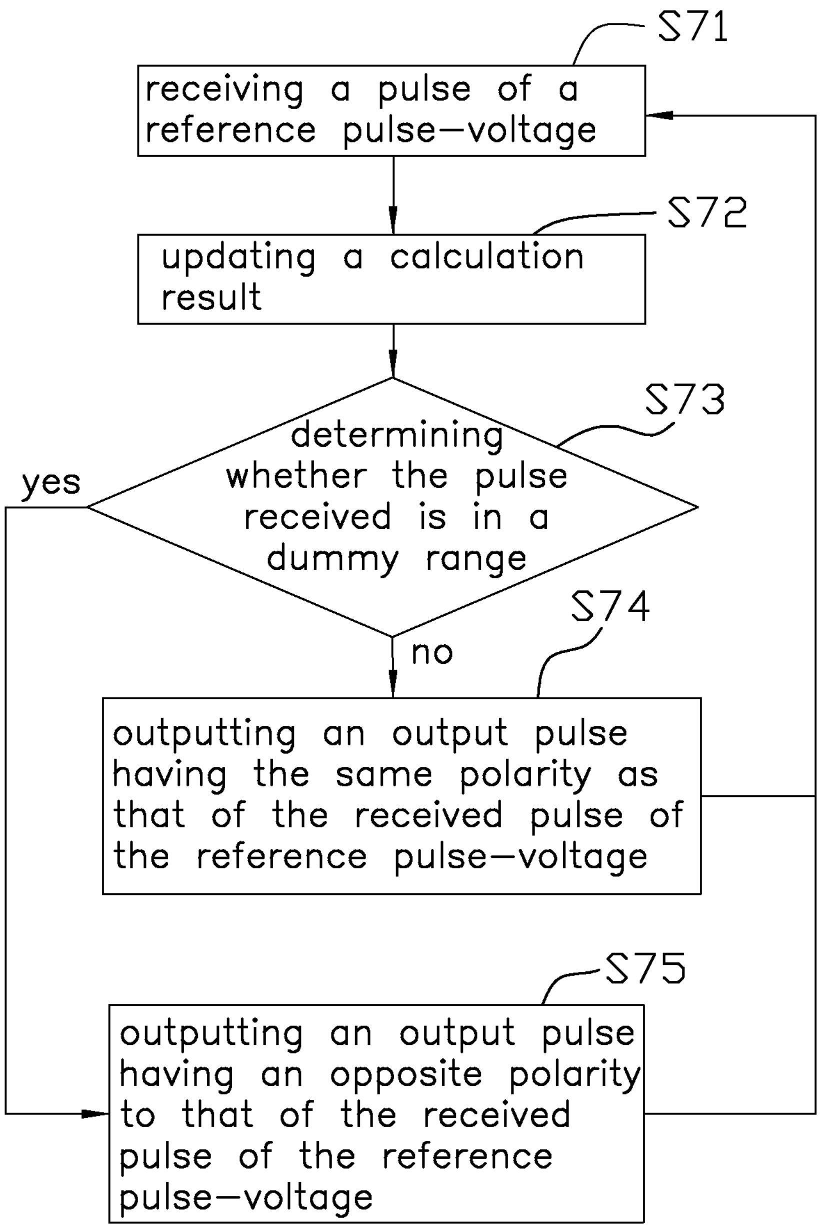
FIG. 3 is a flowchart showing a first embodiment of a voltage regulation method.

Referring to FIGS. 1 and 3, a first embodiment of a voltage regulation method employing the voltage regulator 10 is described as follows.

In step S71, the acquisition unit 11 receives a pulse, either a positive pulse or a negative pulse, of the reference pulse-voltage generated by the driver module 90.

In step S72, the counter 111 updates a calculation result by adding one to the previous calculation result, and transmits the calculation result to the determination unit 112. At the time the voltage regulation method is begun, the initial value of the calculation result is preset to zero.

In step S73, the determination unit 112 determines whether the pulse received by the acquisition unit 11 is in the dummy range, in response to the calculation result. If the pulse is in the dummy range, step S75 is implemented. If the pulse is not in the dummy range, step S74 is implemented. For instance, the driver module 90 drives the liquid crystals to display a frame with 640*480 dpi (dots per inch); and in each frame, the reference pulse-voltage includes 307200 active pulses corresponding to the 307200 pixels, and 3 dummy pulses. The determination unit 112 acquires the calculation result after the counter 111 receives the pulse of the reference pulse-voltage. If the calculation result is less than or equal to 307200, the determination unit 112 determines that the received pulse is in the active range. Otherwise, if the calculation result exceeds 307200, the determination unit 112 determines that the received pulse is in the dummy range.

In step S74, the determination unit 112 does not generate a result message when the pulse of the reference pulse-voltage received by the acquisition unit 11 is determined to be in the active range. Accordingly, the voltage control unit 12 outputs an output pulse having the same polarity as the pulse of the reference pulse-voltage and being identical in magnitude to the pulse of the reference pulse-voltage, and thereupon step S71 is implemented.

In step S75, the determination unit 112 generates a result message if the pulse received by the acquisition unit 11 is determined to be in the dummy range. The voltage control unit 12 accordingly outputs an output pulse having an opposite polarity to that of the pulse of the reference pulse-voltage, and thereupon step S71 is implemented. The result message can be generated in the pulse period of any one of the pulses of the reference pulse-voltage in the dummy range. That is, if there is a plurality of continuous dummy pulses in a dummy range, the determination unit 112 can generate the result message in the pulse period of any one of the dummy pulses still available in the dummy range, or can generate the result message in any other preselected timing range that spans across any two dummy pulses still available in the dummy range. In the present embodiment, the determination unit 112 generates the result message in the same pulse period as that of the dummy pulse of the reference pulse-voltage received by the acquisition unit 11. Accordingly, the output pulse of the output pulse-voltage directly corresponding to the dummy pulse of the reference pulse-voltage has an opposite polarity to that of the dummy pulse of the reference pulse-voltage. This is shown in FIG. 4, described in detail below.

Figure 4:
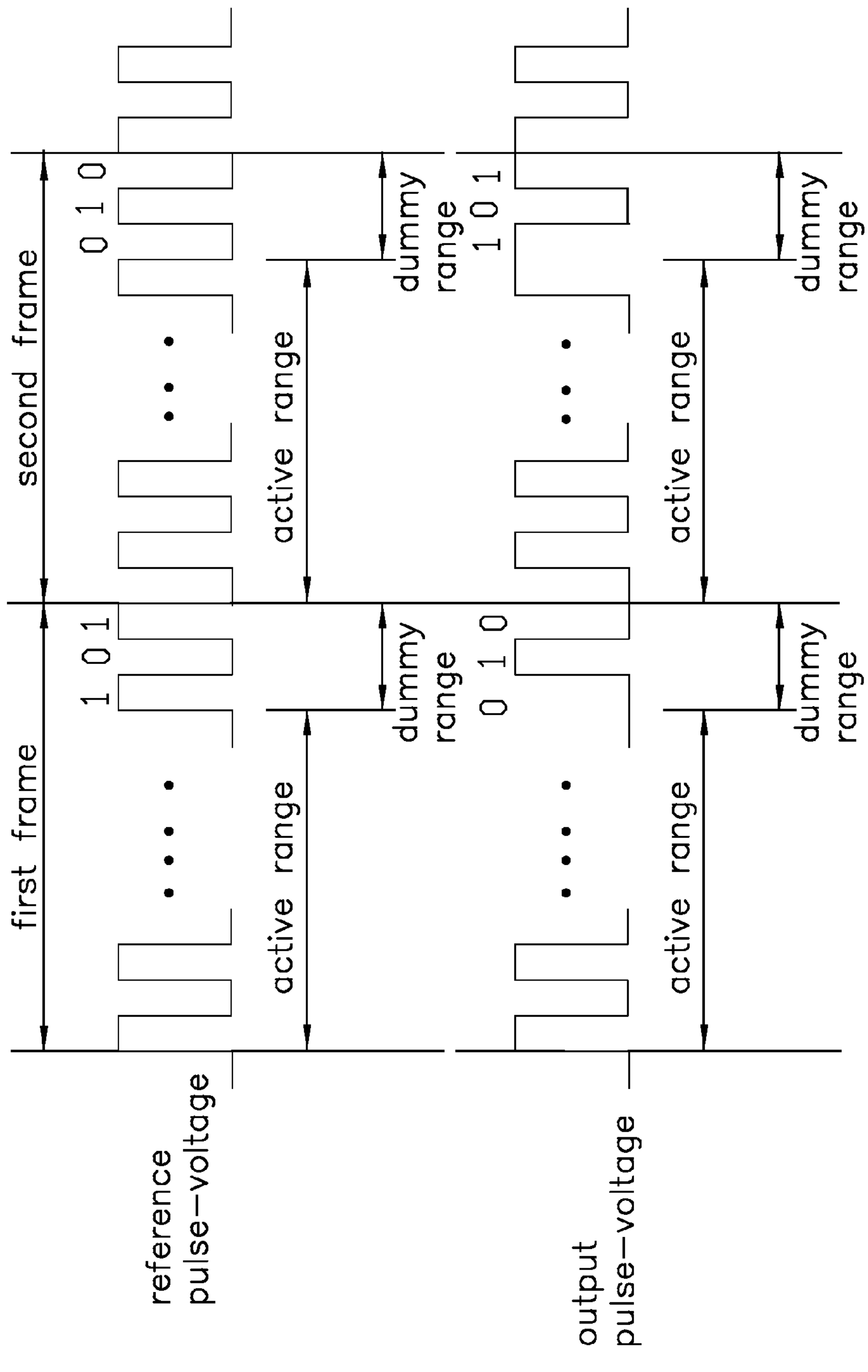
FIG. 4 is a diagram showing the relationship between the reference pulse-voltage of FIG. 2 and an output pulse-voltage regulated by the method of FIG. 3, the output pulse-voltage including active ranges, the active ranges being abbreviated.

Referring to FIG. 4, the number 1 represents positive polarity of a voltage pulse, and the number 0 represents negative polarity of a voltage pulse. When the determination unit 112 determines that the pulse of the reference pulse-voltage received by the acquisition unit 11 is in the active range, the voltage control unit 12 outputs an output pulse having the same polarity as the pulse of the reference pulse-voltage and identical in magnitude to the pulse of the reference pulse-voltage. That is, the voltage control unit 12 outputs the pulse of the reference pulse-voltage without change. When the determination unit 112 determines that the pulse of the reference pulse-voltage received by the acquisition unit 11 is in the dummy range, the voltage control unit 12 generates an output pulse having an opposite polarity to that of the pulse of the reference pulse-voltage. In the present embodiment, the output pulse of the output pulse-voltage directly corresponds to the dummy pulse of the reference pulse-voltage received by the acquisition unit 11. In the first frame as illustrated, a sequence of three consecutive dummy pulses of the reference pulse-voltage are received by the acquisition unit 11, wherein the sequence of polarities of these three pulses is positive-negative-positive. The sequence of polarities of the three corresponding output pulses is negative-positive-negative. Accordingly, the sequence of polarities of the output pulses of the output pulse-voltage in the active range taken together with the sequence of polarities of the output pulses of the output pulse-voltage in the dummy range mean that the output pulse-voltage in the first frame can cause the liquid crystals to oscillate with two or more frequencies. Therefore the noise energy of the oscillating liquid crystals can be dispersed into these plural frequencies, and the peak noise energy in the first frame can be reduced. In addition, the reduction in the peak noise energy can be to a level below the range of noise audible to the human ear.

A second embodiment of a voltage regulator is similar to the voltage regulator 10 of the first embodiment. The difference is, in the second embodiment, the determination unit 112 is configured with a predetermined set value. The set value can be a constant, or a variable between a first boundary value and second boundary value. When the determination unit 112 determines that the calculation result generated by the counter 111 is equal to or exceeds the set value, the determination unit 112 generates a result message. Accordingly, the voltage control unit 12 outputs an output pulse having an opposite polarity to that of the pulse of the reference pulse-voltage received by the acquisition unit 11. Otherwise, when the determination unit 112 determines that the calculation result generated by the counter 111 is less than the set value, the determination unit 112 does not generate a result message. Accordingly, the voltage control unit 12 outputs an output pulse having the same polarity as the pulse of the reference pulse-voltage received by the acquisition unit 11, and being identical in magnitude to the pulse of the reference pulse-voltage. That is, the voltage control unit 12 outputs the pulse of the reference pulse-voltage without change. In such a manner, it is unnecessary for the acquisition unit 11 to determine whether the pulse of the reference pulse-voltage received by the acquisition unit 11 is in a dummy range or an active range.

Figure 5:
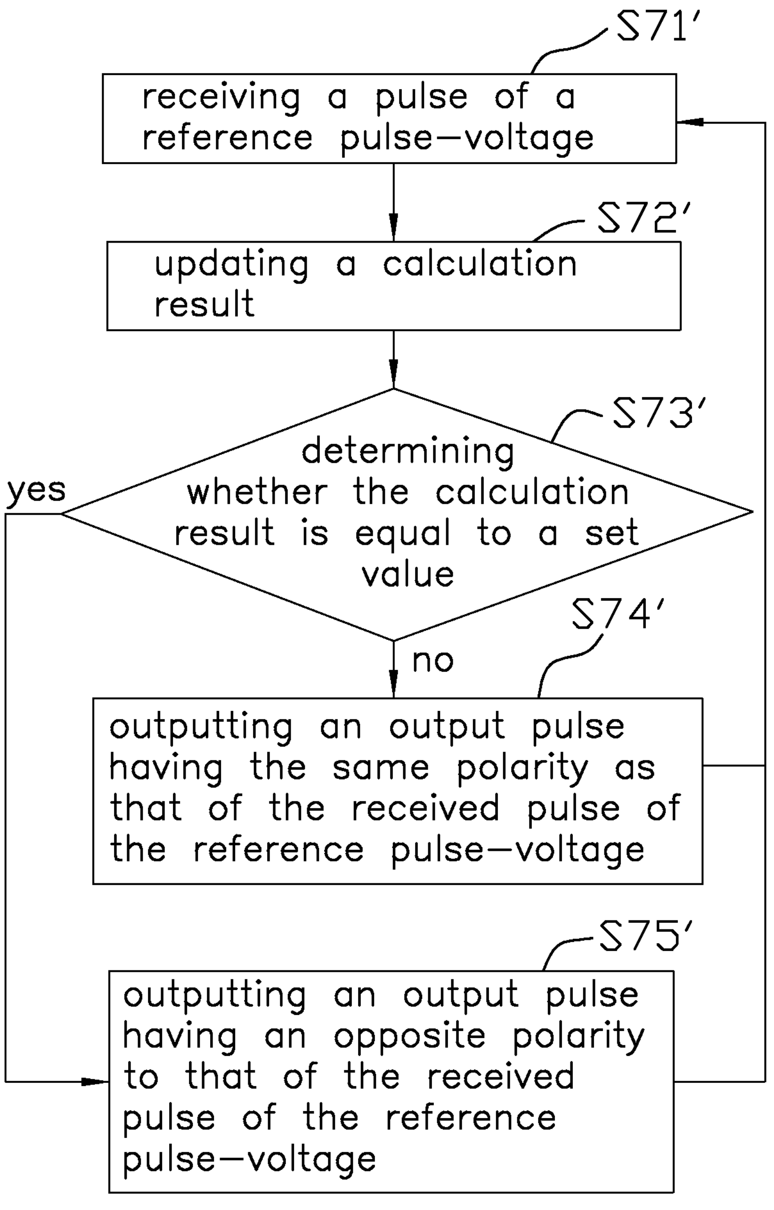
FIG. 5 is a flowchart showing a second embodiment of a voltage regulation method.

Referring to FIGS. 1 and 5, a second embodiment of a voltage regulation method employing the second voltage regulator is described as follows.

In step S71', the acquisition unit 11 receives a pulse of the reference pulse-voltage generated by the driver module 90.

In step S72', the counter 111 updates a calculation result by adding one to the previous calculation result, and transmits the calculation result to the determination unit 112. At the time the voltage regulation method is begun, the initial value of the calculation result is preset to zero.

Figure 6:
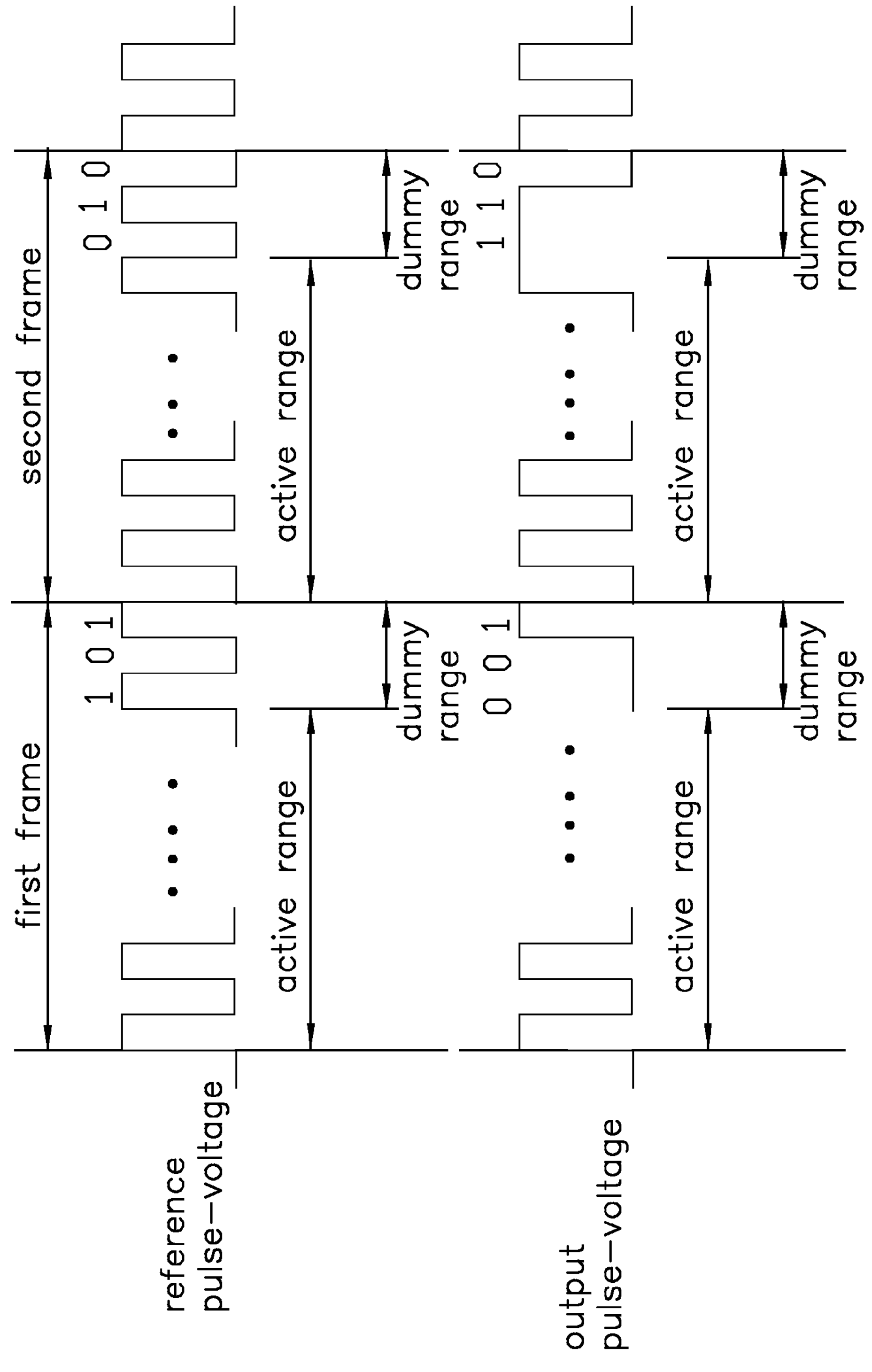
FIG. 6 is a diagram showing the relationship between the reference pulse-voltage of FIG. 2 and an output pulse-voltage regulated by the method of FIG. 5, the output pulse-voltage including active ranges, the active ranges being abbreviated.

In step S73', the determination unit 112 determines whether the calculation result is equal to the set value. When the calculation result is equal to the set value, step S75' is implemented. When the calculation result is other than the set value, step S74' is implemented. For instance, the driver module 90 drives the liquid crystals to display a frame with 640*480 dpi; and in each frame, the reference pulse-voltage includes 307200 active pulses corresponding to the 307200 pixels, and 3 dummy pulses. The first boundary value is predetermined to be 307200, and the second boundary value is predetermined to be 307204. If the set value is predetermined to be 307201, the voltage control unit 12 outputs an output pulse having an opposite polarity to that of the pulse of the reference pulse-voltage when the pulse having a value of 307201 is received by the acquisition unit 11, in any frame. Referring to FIG. 6, the number 1 represents positive polarity of a voltage pulse, and the number 0 represents negative polarity of a voltage pulse. In the first frame, the first dummy pulse of the reference pulse-voltage is a positive pulse, and the corresponding output pulse of the output pulse-voltage is a negative pulse. In the second frame, the first dummy pulse of the reference pulse-voltage is a negative pulse, and the corresponding output pulse of the output pulse-voltage is a positive pulse. Thus, the output pulse-voltage in any one frame can cause the liquid crystals to oscillate with two or more frequencies, and the corresponding reduction in the peak noise energy can be to a level below the range of noise audible to the human ear.

Alternatively, the set value can be updated to a value between the first boundary value and the second boundary value. For example, when the calculation result is equal to the set value 307201, the determination unit 112 not only generates a result message, but also immediately updates the set value to 307203. Accordingly, in the first frame, the voltage control unit 12 produces output pulses (not shown) having opposite polarity to the pulses of the reference pulse-voltage when the pulses having values of 307201 and 307203, respectively, are received by the acquisition unit 11. Then in the second frame, the voltage control unit 12 produces an output pulse (not shown) having opposite polarity to the pulse of the reference pulse-voltage when the pulse having a value of 307203 is received by the acquisition unit 11. Thus, in both the first and second frames, the output pulse-voltage (not shown) can cause the liquid crystals to oscillate with two or more frequencies, and the corresponding reduction in the peak noise energy can be to a level below the range of noise audible to the human ear.

A further alternative example is as follows. The further alternative example is related to the alternative example described in the above paragraph. In particular, the further alternative example is the same as the above alternative example up to the point where, in the first frame, the pulse having a value of 307203 is received by the acquisition unit 11. At this point, when the calculation result is equal to the set value 307203, the determination unit 112 not only generates a result message, but also immediately updates the set value to 307202, such that in the second frame, the voltage control unit 12 produces an output pulse (not shown) having an opposite polarity to that of the pulse of the reference pulse-voltage when the second dummy pulse having a value of 307202 is received by the acquisition unit 11. Thus, in both the first and second frames, the output pulse-voltage (not shown) can cause the liquid crystals to oscillate with two or more frequencies, and the corresponding reduction in the peak noise energy can be to a level below the range of noise audible to the human ear.

It should be understood that in the above-described alternative and further alternative examples, since the set value can be a variable, the number and/or time of occurrence of the output pulses having opposite polarity to the corresponding pulses of the reference pulse-voltage for specific frames are different. In such a manner, in various of the frames, the reference pulse-voltage can be regulated to produce an output pulse-voltage that can cause the liquid crystals to oscillate with two or more frequencies, and the corresponding reduction in the peak noise energy can be to a level below the range of noise audible to the human ear.

In step S74', the determination unit 112 does not generate a result message. The voltage control unit 12 outputs an output pulse identical to the pulse of the reference pulse-voltage, and thereupon step S71' is implemented.

In step S75', the determination unit 112 generates a result message. The voltage control unit 12 outputs an output pulse having an opposite polarity to that of the pulse of the reference pulse-voltage, and thereupon step S71' is implemented.

Referring to FIG. 6, each time when the determination unit 112 determines that the calculation result is less than the set value, the voltage control unit 12 outputs the pulse of the reference pulse-voltage without change. When the determination unit 112 determines that the calculation result is equal to or exceeds the set value, the voltage control unit 12 outputs an output pulse having an opposite polarity to that of the pulse of the reference pulse-voltage. In the first frame as illustrated, a sequence of three consecutive dummy pulses of the reference pulse-voltage are received by the acquisition unit 11, wherein the sequence of polarities of these three pulses is positive-negative-positive. The sequence of polarities of the three corresponding output pulses is negative-negative-positive. In the second frame as illustrated, a sequence of three consecutive dummy pulses are received by the acquisition unit 11, wherein the sequence of polarities of these three pulses is negative-positive-negative. The sequence of polarities of the three corresponding output pulses is positive-positive-negative. Thus in the first and second frames overall, the output pulse-voltage can cause the liquid crystals to oscillate with four or more frequencies. Therefore the noise energy of the oscillating liquid crystals can be dispersed into these plural frequencies, and the corresponding reduction in the peak noise energy can be to a level below the range of noise audible to the human ear.

In the above-described first and second embodiments, when the calculation result is equal to the sum of the number of active pulses and the number of dummy pulses for a corresponding frame, the counter 111 is reset to zero, so that the next calculation result for the next frame can be obtained.

Figure 7:
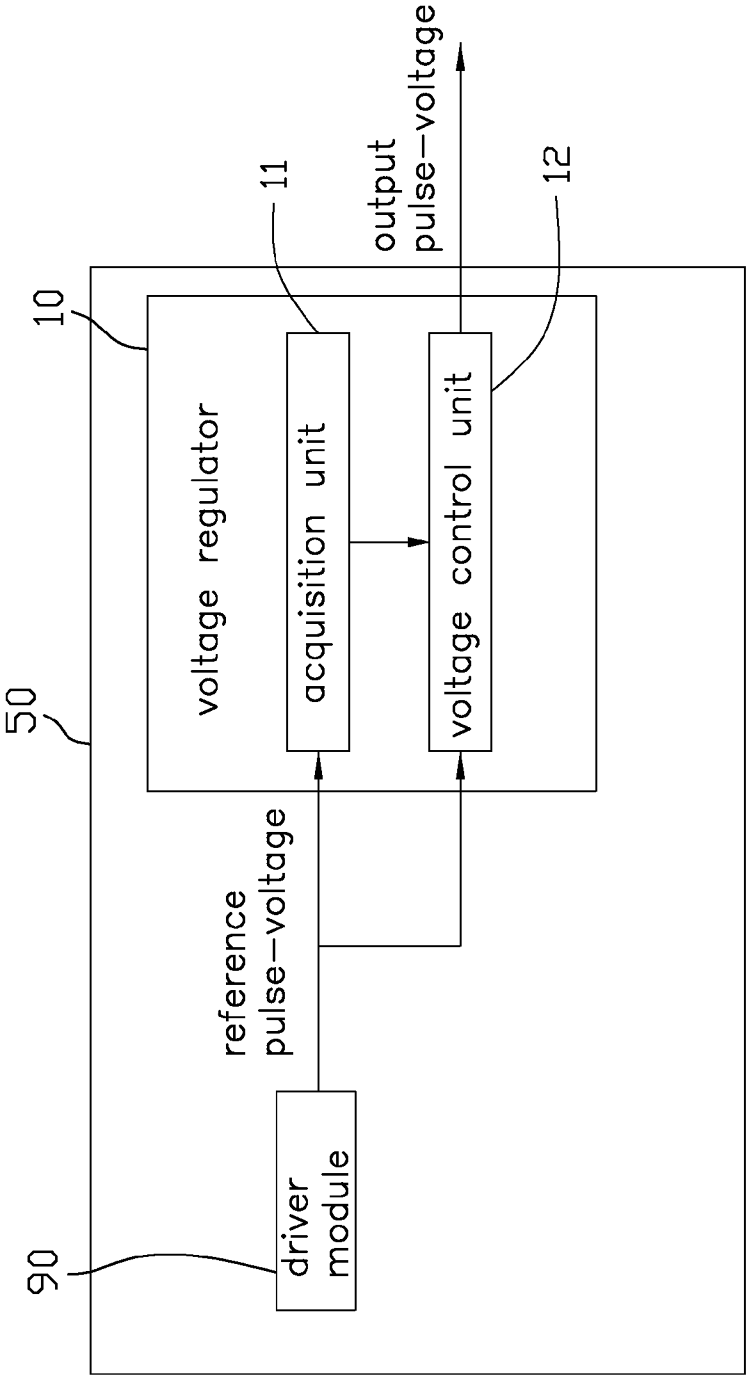
FIG. 7 is a functional block diagram of an exemplary liquid crystal driver integrated circuit (IC) employing the voltage regulator and the driver module of FIG. 1.

Referring to FIG. 7, an exemplary liquid crystal driver unit 50 including the voltage regulator 10 and the driver module 90 is shown. The driver module 90 is capable of generating the reference pulse-voltage. In one embodiment, the driver module 90 is similar to a conventional driver module that outputs pulse-voltages and control voltages, and is in the form of a driver IC. The acquisition unit 11 and the voltage control unit 12 of the voltage regulator 10 are electrically connected to the driver module 90 to receive the reference pulse-voltage, respectively. In another embodiment, the driver module 90 is electrically connected to the acquisition unit 11 and the voltage control unit 12, and the driver module 90 and the voltage regulator 10 are integrally formed in the liquid crystal driver unit 50. That is, the liquid crystal driver unit 50 is a single IC.

Figure 8:
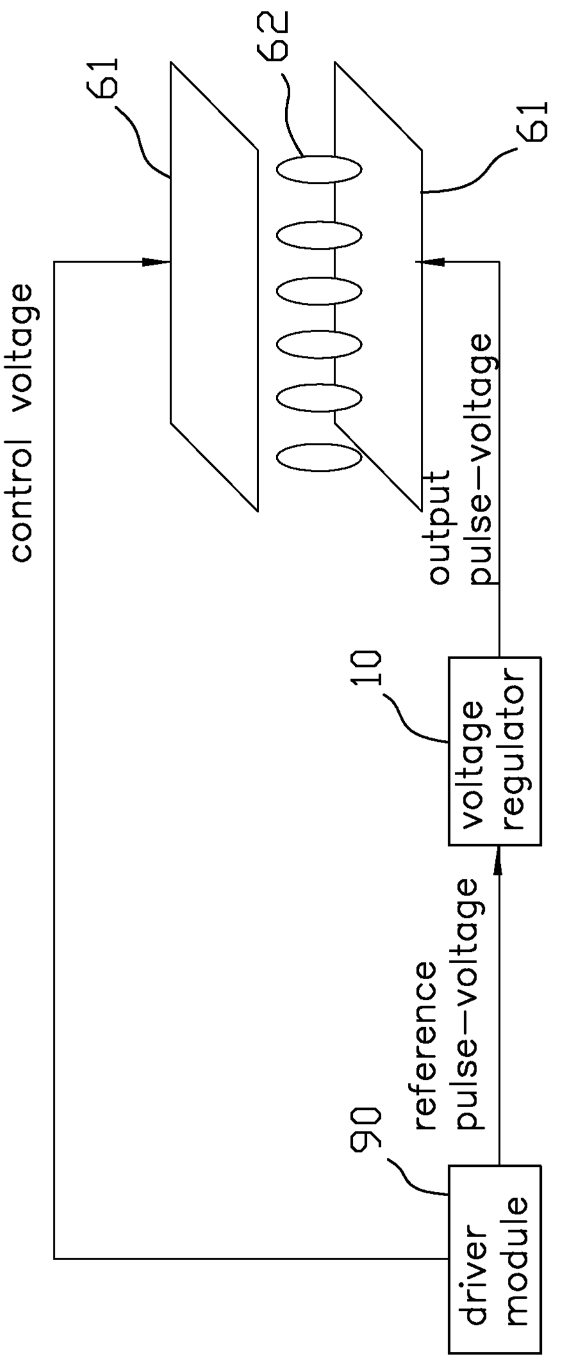
FIG. 8 is a schematic diagram of an embodiment of a liquid crystal display device employing the voltage regulator and the driver module of FIG. 1.

Referring to FIG. 8, one embodiment of a liquid crystal display device includes the driver module 90, the voltage regulator 10, two parallel substrates 61, and liquid crystals 62 packaged between the two substrates 61. The driver module 90 is capable of generating the reference pulse-voltage and a control voltage. The voltage regulator 10 is capable of generating the output pulse-voltage. The two substrates 61 are controlled by the control voltage and the output pulse-voltage, respectively, such that an electric field is generated between the two substrates 61 to align the liquid crystals 62 toward predetermined directions. Since the voltage control unit 12 is capable of regulating the reference pulse-voltage to produce an output pulse-voltage that can cause the liquid crystals 62 to oscillate with two or more frequencies, the noise energy of the oscillating liquid crystals 62 can be dispersed into these plural frequencies, and the peak noise energy in each frame can be efficiently reduced.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A voltage regulator for controlling a reference pulse-voltage comprising a sequence of positive-negative pulses, the reference pulse-voltage defining an active range and a dummy range, the voltage regulator comprising:

an acquisition unit adapted to receive each pulse of the reference pulse-voltage, and determine whether an alteration of the pulse is needed according to a predetermined calculation and generate a result message when it is determined that an alteration of the voltage pulse is needed; and a voltage control unit adapted to generate an output pulse-voltage corresponding to the reference pulse-voltage, wherein when no result message is generated, the voltage control unit is configured to output an output pulse having the same polarity as that of the received pulse of the reference pulse-voltage; and when the result message is generated, the voltage control unit is configured to output an output pulse having an opposite polarity dummy range to that of the received pulse of the reference pulse-voltage.

2. The voltage regulator of claim 1, wherein the predetermined calculation comprises a determination that the pulse received by the acquisition unit is in the dummy range.

3. The voltage regulator of claim 2, wherein the acquisition unit comprises a counter and a determination unit, the counter is adapted to update a calculation result when the counter receives a pulse of the reference pulse-voltage and transmit the updated calculation result to the determination unit, and the determination unit is adapted to determine whether the pulse received is in the dummy range based on the updated calculation result.

4. The voltage regulator of claim 1, wherein the acquisition unit comprises a counter and a determination unit, the counter is adapted to update a calculation result in response to the number of pulses already received by the counter and transmit the updated calculation result to the determination unit, and the determination unit is adapted to receive the updated calculation result and determine whether the updated calculation result is equal to or exceeds a set value, and generate the result message when it is determined that the updated calculation result is equal to or exceeds the set value.

5. The voltage regulator of claim 4, wherein the set value is a predetermined constant.

6. The voltage regulator of claim 4, wherein the set value is a predetermined variable between a first boundary value and a second boundary value controlled by the determination unit.

7. A voltage regulation method for controlling a reference pulse-voltage comprising a sequence of positive-negative pulses, the reference pulse-voltage defining an active range and a dummy range, the voltage regulation method comprising:

receiving a pulse of the reference pulse-voltage;

determining whether an alteration of the pulse is needed according to a predetermined calculation;

outputting an output pulse having the same polarity as that of the received pulse when it is determined that no alteration of the pulse is needed; or generating a result message when it is determined that an alteration of the pulse is needed; and generating an output pulse in response to the result message, wherein the output pulse has an opposite polarity dummy range to that of the received pulse, and outputting the output pulse.

8. The voltage regulation method of claim 7, wherein the predetermined calculation comprises a determination as to whether the pulse received is in the dummy range.

9. The voltage regulation method of claim 8, wherein the result message is generated in a predetermined pulse period when it is determined that the pulse is in the dummy range, one or more pulses of the reference pulse-voltage are in the dummy range, and the predetermined pulse period is selected from any one or more items in the group consisting of the period of the pulse that is determined to be in the dummy range and the period of any pulse subsequent to the determined pulse that is also in the dummy range.

10. The voltage regulation method of claim 8, further comprising counting a sequence number of each pulse of the reference pulse-voltage received to obtain a calculation result for each received pulse, updating the calculation result after receiving the pulse of the reference pulse-voltage, and determining whether the pulse received is in the dummy range based on the updated calculation result.

11. The voltage regulation method of claim 7, further comprising counting a sequence number of each pulse of the reference pulse-voltage received to obtain a calculation result for each received pulse, and updating the calculation result after receiving the pulse of the reference pulse-voltage, wherein the predetermined calculation comprises determining whether the updated calculation result is equal to or exceeds a set value.

12. The voltage regulation method of claim 11, wherein the set value is a predetermined constant.

13. The voltage regulation method of claim 11, wherein the set value is a predetermined variable between a first boundary value and a second boundary value.

14. The voltage regulation method of claim 7, further comprising providing a voltage regulator capable of carrying out the method.

15. A liquid crystal display device comprising:

a driver module adapted to generate a reference pulse-voltage comprising a sequence of positive-negative pulses, and a control voltage, the reference pulse-voltage defining an active range and a dummy range;

a voltage regulator comprising:

an acquisition unit adapted to receive each pulse of the reference pulse-voltage, and determine whether an alteration of the pulse is needed according to a predetermined calculation and generate a result message when it is determined that an alteration of the pulse is needed; and a voltage control unit adapted to generate an output pulse-voltage corresponding to the reference pulse-voltage, wherein when no result massage is generated, the voltage control unit is configured to output an output pulse having the same polarity as that of the received pulse of the reference pulse-voltage; and when the result message is generated, the voltage control unit is configured to output an output pulse having an opposite polarity dummy range to that of the received pulse of the reference pulse-voltage;

two parallel substrates; and liquid crystals packaged between the two parallel substrates, wherein the two substrates are controllable by the control voltage and the output voltage respectively such that an electric field is generated between the two substrates to align the liquid crystals toward one or more predetermined directions.

16. The liquid crystal display device of claim 15, wherein the predetermined calculation comprises a determination that the pulse received by the acquisition unit is in the dummy range.

17. The liquid crystal display device of claim 16, wherein the acquisition unit comprises a counter and a determination unit, the counter is adapted to update a calculation result when the counter receives each pulse of the reference pulse-voltage and transmit the updated calculation result to the determination unit, and the determination unit is adapted to determine whether the pulse received is in the dummy range based on the updated calculation result.

18. The liquid crystal display device of claim 15, wherein the acquisition unit comprises a counter and a determination unit, the counter is adapted to update a calculation result in response to the number of pulses already received by the counter and transmit the updated calculation result to the determination unit, and the determination unit is adapted to receive the updated calculation result and determine whether the updated calculation result is equal to or exceeds a set value and generate the result message when it is determined that the updated calculation result is equal to or exceeds the set value.

19. The liquid crystal display device of claim 18, wherein the set value is a predetermined constant.

20. The liquid crystal display device of claim 18, wherein the set value is a predetermined variable between a first boundary value and a second boundary value.

* * * * *